US012736857B2

(12) United States Patent
Xu

(10) Patent No.: US 12,736,857 B2
(45) Date of Patent: Sep. 15, 2026

(54) CLAMPING ASSEMBLY AND HANDHELD AUXILIARY PHOTOGRAPHIC DEVICE USING CLAMPING ASSEMBLY

(71) Applicant: SHENZHEN YUANSU CHUANGDA TECHNOLOGY CO., LTD, Guangdong (CN)

(72) Inventor: Xibin Xu, Shenzhen (CN)

(73) Assignee: SHENZHEN YUANSU CHUANGDA TECHNOLOGY CO., LTD, Shenzhen (CN)

(*) Notice: Subject to any disclaimer, the term of this patent is extended or adjusted under 35 U.S.C. 154(b) by 176 days.

(21) Appl. No.: 18/934,890

(22) Filed: Nov. 1, 2024

(65) Prior Publication Data

US 2025/0251650 A1 Aug. 7, 2025

(30) Foreign Application Priority Data

Feb. 2, 2024 (CN) ........................ 202420260387.3

(51) Int. Cl.
*G03B 17/56* (2021.01)

(52) U.S. Cl.
CPC ......... *G03B 17/561* (2013.01); *G03B 17/566* (2013.01)

(58) Field of Classification Search
CPC .. G03B 17/561; G03B 17/563; G03B 17/566; H04N 23/57; F16M 11/041
See application file for complete search history.

(56) References Cited

U.S. PATENT DOCUMENTS

2020/0192197 A1* 6/2020 Li .......................... F16M 13/04
2022/0404688 A1* 12/2022 Zhou ...................... H04N 23/51
2024/0006834 A1* 1/2024 Ferrier ................... F16M 11/16

FOREIGN PATENT DOCUMENTS

EP 4715350 A1 * 3/2026 ............ G01J 5/0265
WO WO-2013144351 A1 * 10/2013 ............ F16M 11/14

* cited by examiner

*Primary Examiner* — Christopher E Mahoney
(74) *Attorney, Agent, or Firm* — HOWARD M COHN and Associates, LLC

(57) ABSTRACT

Disclosed are a clamping assembly and a handheld auxiliary photographic device using the clamping assembly. The clamping assembly comprises a main shell and clamping blocks, wherein a main control board and at least one group of guide pillars electrically connected to the main control board are arranged in the main shell, and the guide pillars are able to retract into and stretch out of one end surface of the main shell; and at least two clamping blocks are respectively arranged at two ends of the main shell to form a clamping area and are correspondingly connected to the guide pillars stretching out of the main shell at the same end. The guide pillars, as conducting structures, work together with power supply contacts formed on surfaces of the clamping blocks to supply power to external function expansion modules to drive the function expansion modules.

10 Claims, 8 Drawing Sheets

CLAMPING ASSEMBLY AND HANDHELD AUXILIARY PHOTOGRAPHIC DEVICE USING CLAMPING ASSEMBLY

BACKGROUND OF THE INVENTION

1. Technical Field

The invention relates to the field of camera stabilizer structures, in particular to a clamping assembly and a camera stabilizer using the clamping assembly.

2. Description of Related Art

With the continuous improvement in living standard and rapid development of electronic products, mobile phone cameras have an increasingly higher resolution and are being widely applied to more and more scenarios in life, and mobile phones become portable tools for recording. To obtain better photography experience, related auxiliary photographic instruments, such as tripods, selfies and camera stabilizers, are often used to assist photography. All these products can be used as needed to satisfy requirements of different customers to expand the application of mobile phones as main photographic instruments.

To effectively adapt to different usage scenarios, different function expansion modules are used to improve the adaptivity to environments. For example, in a dark scenario, a fill light module and a stabilizer are used together; and in a scenario of poor tracking performance, a tracking module and a stabilizer used together. It should be noted that the function expansion modules are generally assembled at two ends of a clamping assembly of the stabilizer, and it is found in actual use that the clamping assembly cannot supply power to the function expansion modules to drive the function expansion modules, so separate battery modules have to be arranged in the function expansion modules, which greatly increases the overall weight of the function expansion modules, leading to poor grip experience of users; and the load borne by a support arm for supporting the clamping assembly is increased, leading to a shorter service life of the camera stabilizer. Therefore, a clamping assembly with a more reasonable structure is urgently needed to be applied to camera stabilizers to solve these technical problems.

BRIEF SUMMARY OF THE INVENTION

The objective of the invention is to provide solution to solve the technical problem that clamping assemblies applied to clamping structures of camera stabilizers in the prior art cannot supply power to function expansion modules.

To fulfill the above objective, the invention provides a clamping assembly, comprising:

a main shell, a main control board and at least one group of guide pillars electrically connected to the main control board being arranged in the main shell, and the guide pillars being able to retract into and stretch out of an end surface of the main shell; and clamping blocks, at least two clamping blocks being respectively arranged at two ends of the main shell to form a clamping area: surfaces, facing each other, of the two clamping blocks being correspondingly connected to the guide pillars stretching out of the main shell at the same end, and power supply contacts being formed on surfaces of the clamping blocks by means of the guide pillars.

As an improvement of the invention, the clamping assembly further comprises a positive output plate and a negative output plate located on two sides of the main control board, wherein two sides, facing each other, of the positive output plate and the negative output plate are correspondingly and electrically connected to the main control board, and two sides, backing on to each other, of the positive output plate and the negative output plate are electrically connected to the guide pillars in a same group.

As an improvement of the invention, each group of guide pillar comprises a first guide pillar and a second guide pillar, and ferrules on the positive output plate and the negative output plate are correspondingly disposed around the first guide pillar and the second guide pillar; and ends, stretching out of the main shell, of the first guide pillar and the second guide pillar in a same group stretch into the clamping block at the same end, and the power supply contacts are formed in an outer wall of the clamping block.

As an improvement of the invention, stop pillars are arranged at ends, located in the main shell, of the first guide pillar and the second guide pillar in each group, and a cross-sectional diameter of each stop pillar is greater than a cross-sectional diameter of the first guide pillar or the second guide pillar where the stop pillar is located; and the ferrules are correspondingly arranged at two ends of the positive output plate and two ends of the negative output plate.

As an improvement of the invention, each first guide pillar and each second guide pillar are sleeved with spring structures, and each spring structure is arranged between the corresponding stop pillar and the corresponding ferrule.

As an improvement of the invention, conducting sleeves are arranged the ends, stretching into the corresponding clamping block, of each first guide pillar and each second guide pillar, an end, away from the main shell, of each conducting sleeve is connected to one end of a conducting strip, and the other end of the conducting strip forms the power supply contact on the surface of the corresponding clamping block.

As an improvement of the invention, a first wiring hole is formed in a surface of the main control board, and a second wiring hole matched with the first wiring hole is formed on a surface, away from the clamping area, of the main shell.

As an improvement of the invention, a clamping surface of each clamping block is coated with a silicone layer.

The application further provides a handheld auxiliary photographic device, comprising a grip portion having a battery module arranged therein, a support rod and function expansion modules, wherein the support rod has an end connected to the grip portion and an end connected to the clamping assembly described above; and the function expansion modules are detachably connected to the surface, provided with the power supply contacts, of the clamping blocks, and are provided with power receiving pins matched with the power supply contacts.

As an improvement of the invention, the function expansion modules are connected to the clamping blocks by one or more of magnetic connection, snap fit and plug connection.

The invention has the following beneficial effects: compared with the prior art, the invention provides a clamping assembly and a handheld auxiliary photographic device using the clamping assembly, and the clamping assembly comprises a main shell and clamping blocks, wherein a main control board and at least one group of guide pillars electrically connected to the main control board are arranged in the main shell, and the guide pillars are able to retract into and stretch out of one end surface of the main shell; at least two clamping blocks are respectively arranged at two ends of the main shell to form a clamping area, surfaces, facing each other, of the two clamping blocks are correspondingly connected to the guide pillars stretching out of the main shell at the same end, and power supply contacts are formed on surfaces of the clamping blocks; on one hand, the guide pillars can slidably stretch and retract to control relative positions of the clamping blocks to adjust the clamping area so as to stably clamp a photographic terminal; on the other hand, after wires are connected and arranged, the guide pillars, as conducting structures, can work together with the power supply contacts to supply power to external function expansion modules to drive the function expansion modules, such that the function expansion modules no longer need to be provided with independent batteries, thus greatly optimizing the weight distribution of the device and providing better user experience.

REFERENCE SIGNS OF MAIN COMPONENTS

- 1, main shell; 11, main control board; 111, first wiring hole; 12, guide pillar;
- 121, first guide pillar; 122, second guide pillar; 123, stop pillar; 13, positive output plate;
- 14, negative output plate; 15, ferrule; 16, conducting sleeve; 17, second wiring hole;
- 18, magnet assembly; 2, first clamping block; 3, second clamping block; 4, function expansion module: 41, groove;
- 5, grip portion; 6, support rod; 7, power supply contact; 8, conducting strip; 9, spring structure.

DETAILED DESCRIPTION OF THE INVENTION

To better clarify the invention, the invention is further described below in conjunction with accompanying drawings.

In the following description, details of generally selected embodiments are provided below to gain a deeper understanding of the invention. Obviously, the embodiments in the following description are merely illustrative ones, and are not all possible ones of the invention. It should be understood that the following specific embodiments are used for explaining the invention rather than limiting the invention.

It should be understood that terms “include” and/or “comprise” used in the description indicates the presence of features, entities, steps, operations, elements or assemblies indicated, not excluding the presence or addition of one or more other features, entities, steps, operations, elements, assemblies or combinations thereof.

To effectively adapt to different usage scenarios, different function expansion modules are used to improve the adaptivity to environments. For example, in a dark scenario, a fill light module and a stabilizer are used together; and in a scenario of poor tracking performance, a tracking module and a stabilizer used together. It should be noted that the function expansion modules are generally assembled at two ends of a clamping assembly of the stabilizer, and it is found in actual use that the clamping assembly cannot supply power to the function expansion modules to drive the function expansion modules, so separate battery modules have to be arranged in the function expansion modules, which greatly increases the overall weight of the function expansion modules, leading to poor grip experience of users; and the load borne by a support arm for supporting the clamping assembly is increased, leading to a shorter service life of the camera stabilizer. Therefore, a clamping assembly with a more reasonable structure is urgently needed to be applied to camera stabilizers to solve these technical problems.

Figure 1:
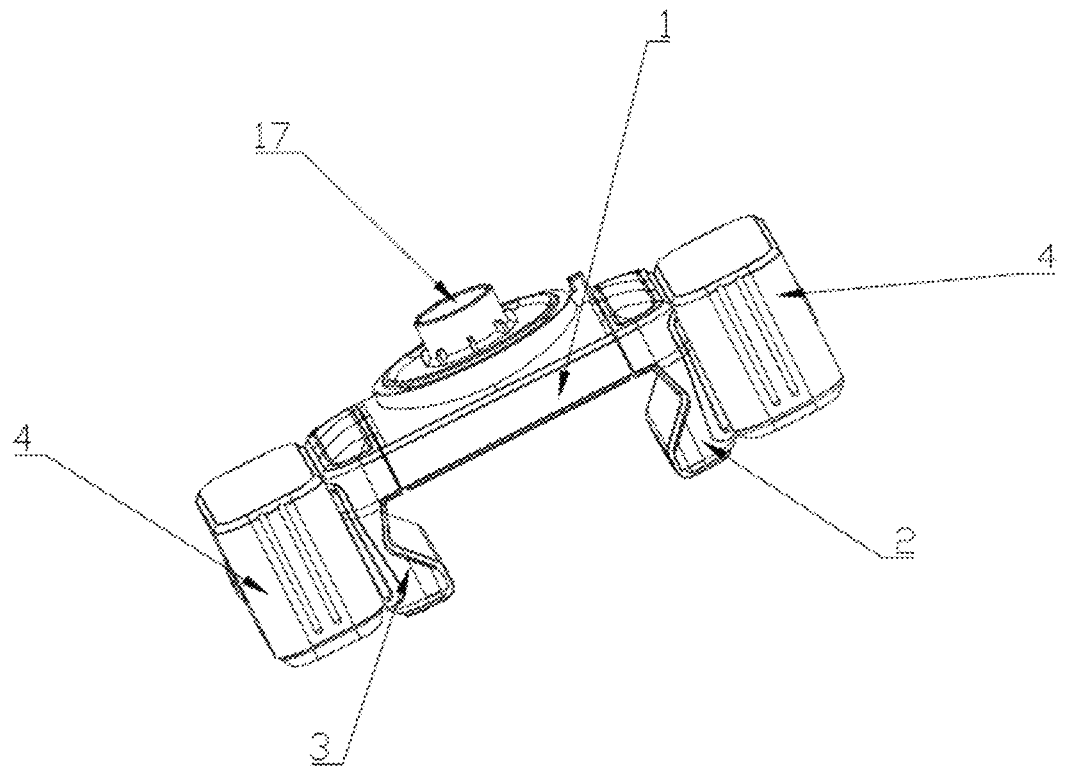
FIG. 1 is a three-dimensional view of a clamping assembly according to the invention.
Figure 2:
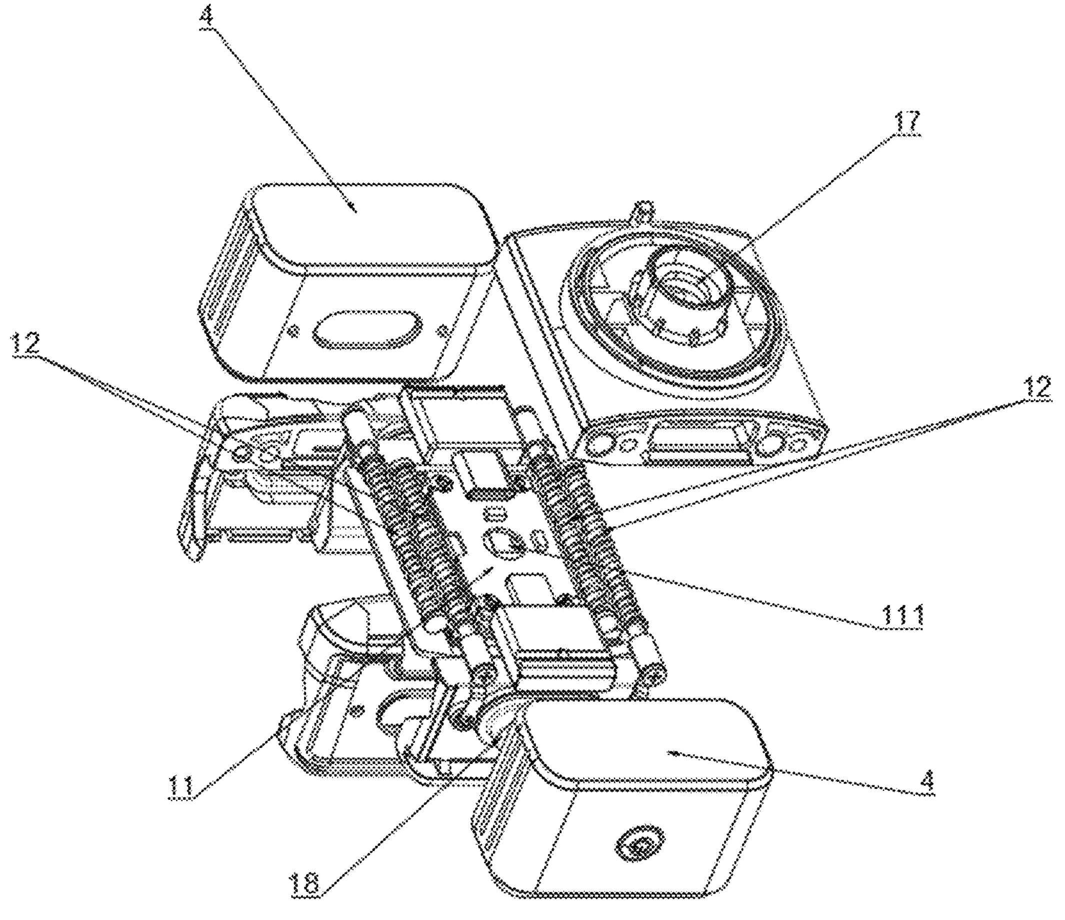
FIG. 2 is an exploded view of the clamping assembly according to the invention.
Figure 3:
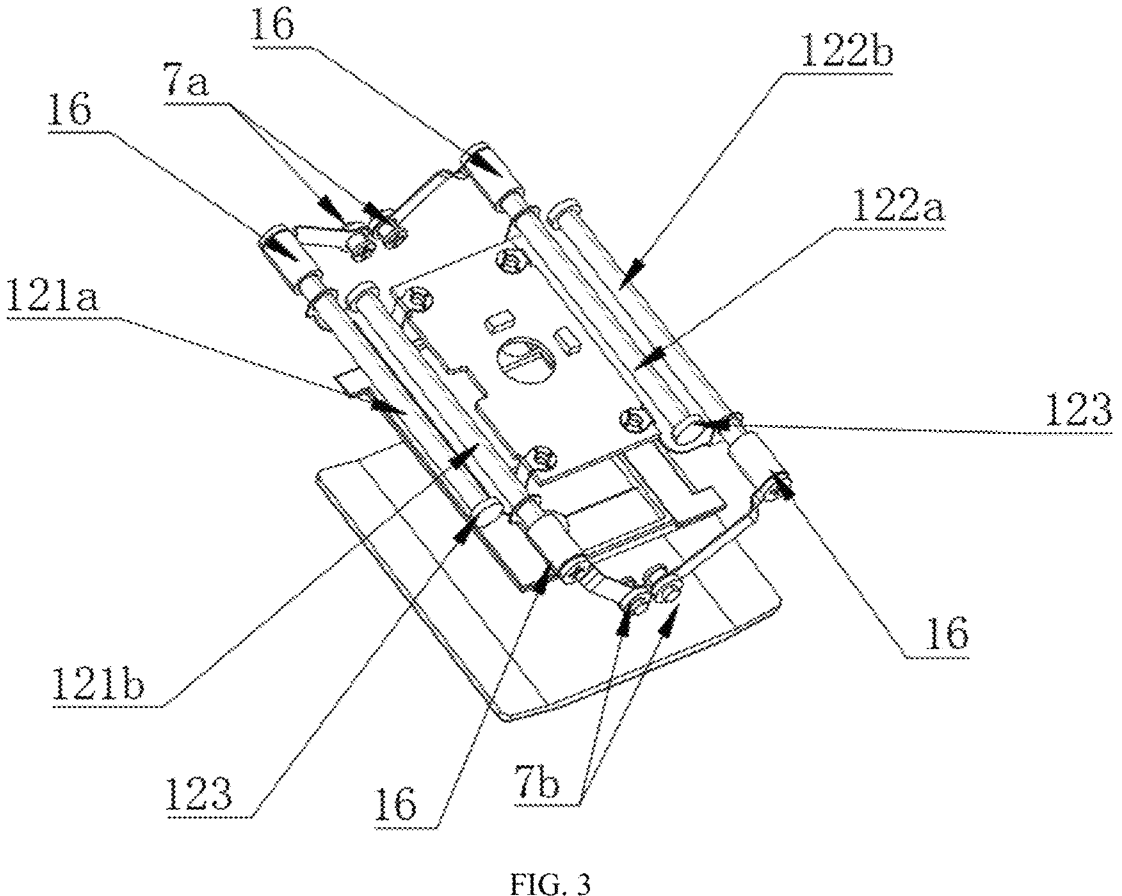
FIG. 3 is another exploded view of the clamping assembly according to the invention.
Figure 4:
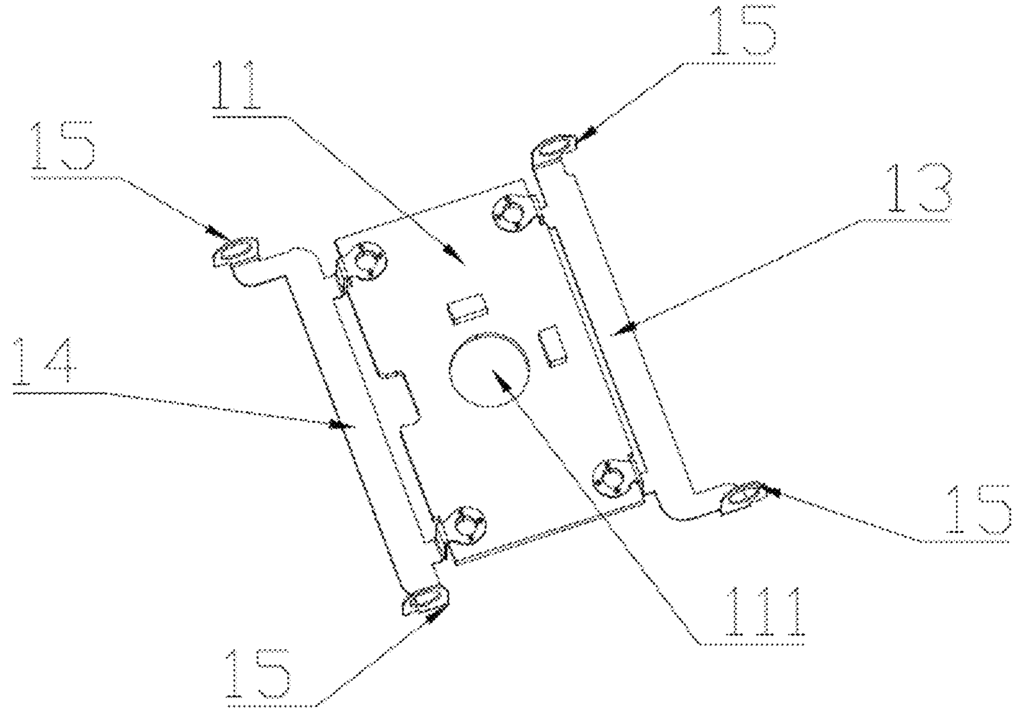
FIG. 4 is a coordination diagram of a main control board, a positive output plate and a negative output plate according to the invention.
Figure 5:
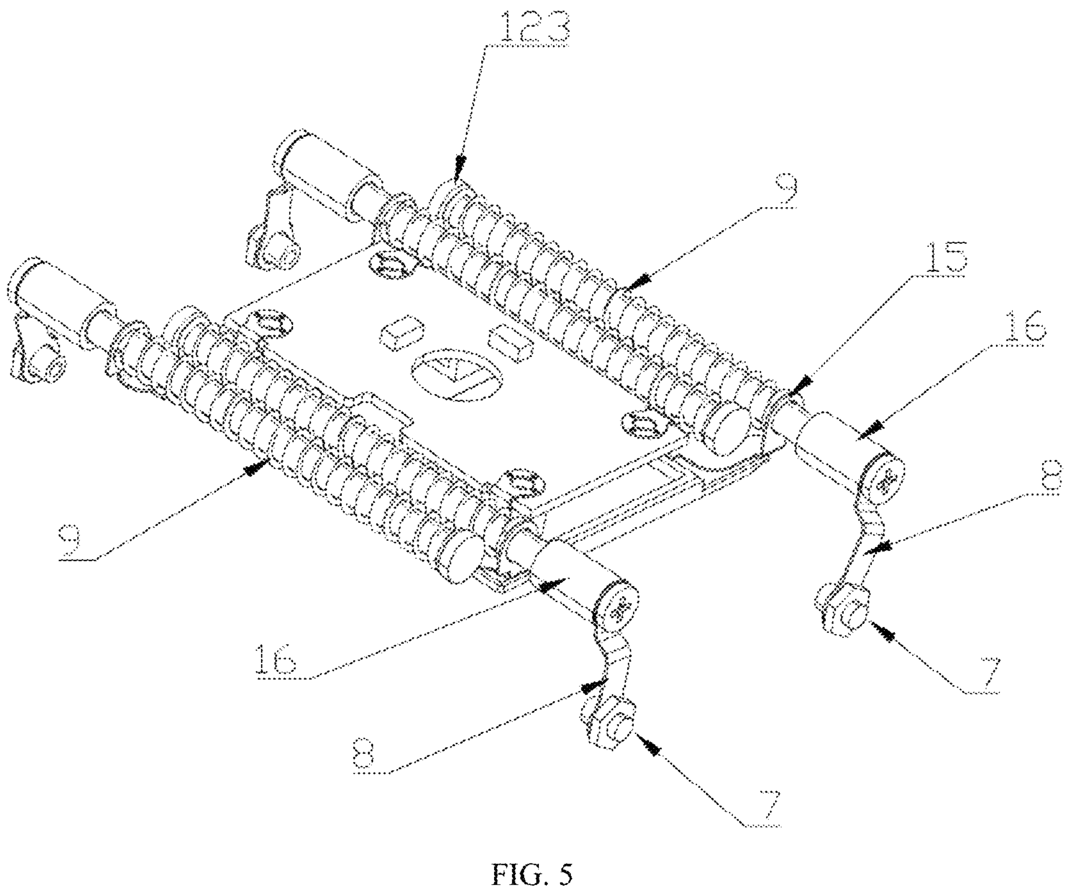
FIG. 5 is a coordination diagram of spring structures according to the invention.
Figure 6:
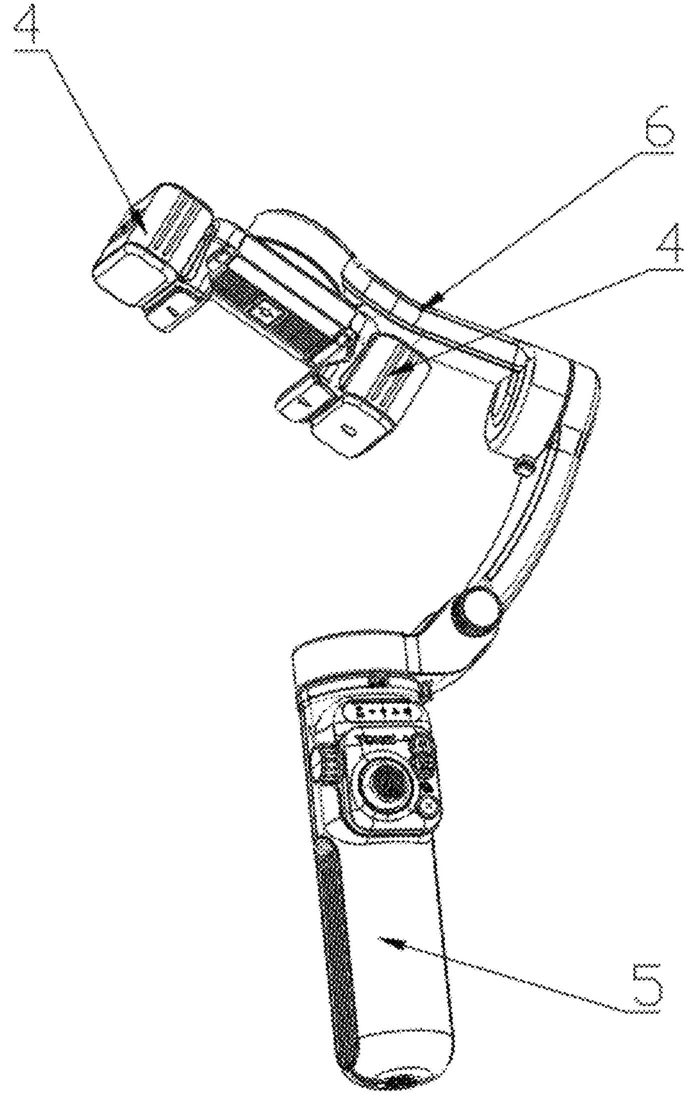
FIG. 6 is a three-dimensional view of a handheld auxiliary photographic device according to the invention.
Figure 7:
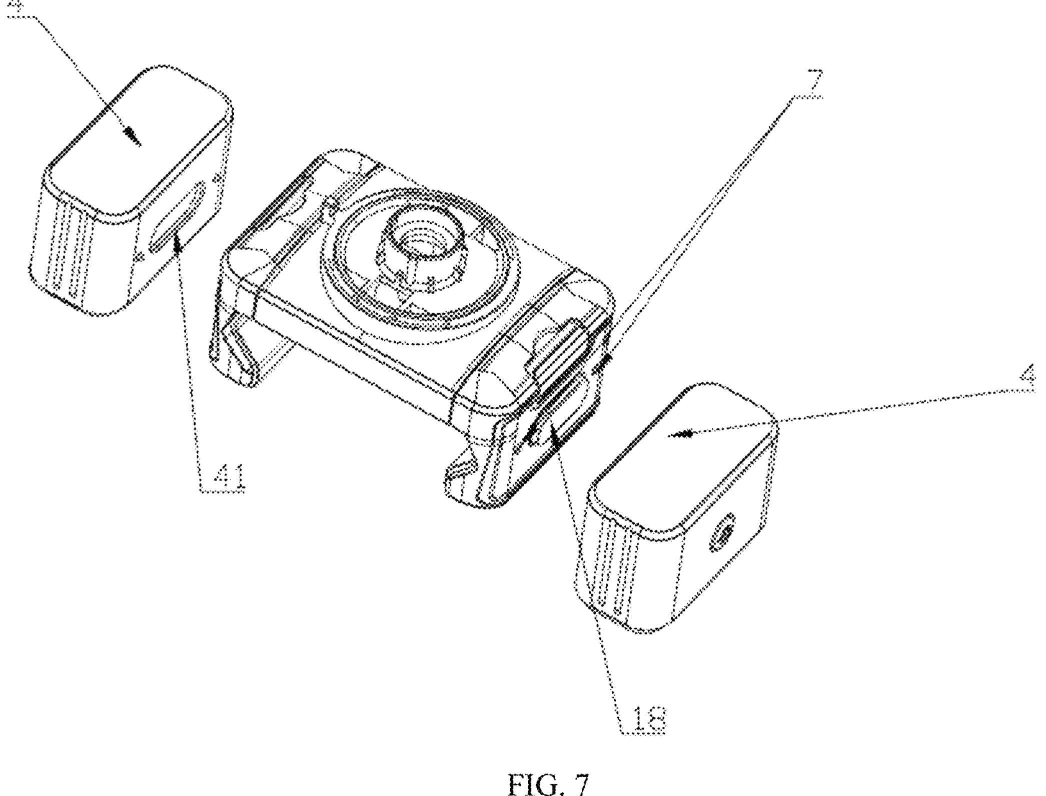
FIG. 7 is a coordination diagram of a clamping assembly and function expansion modules according to the invention.
Figure 8:
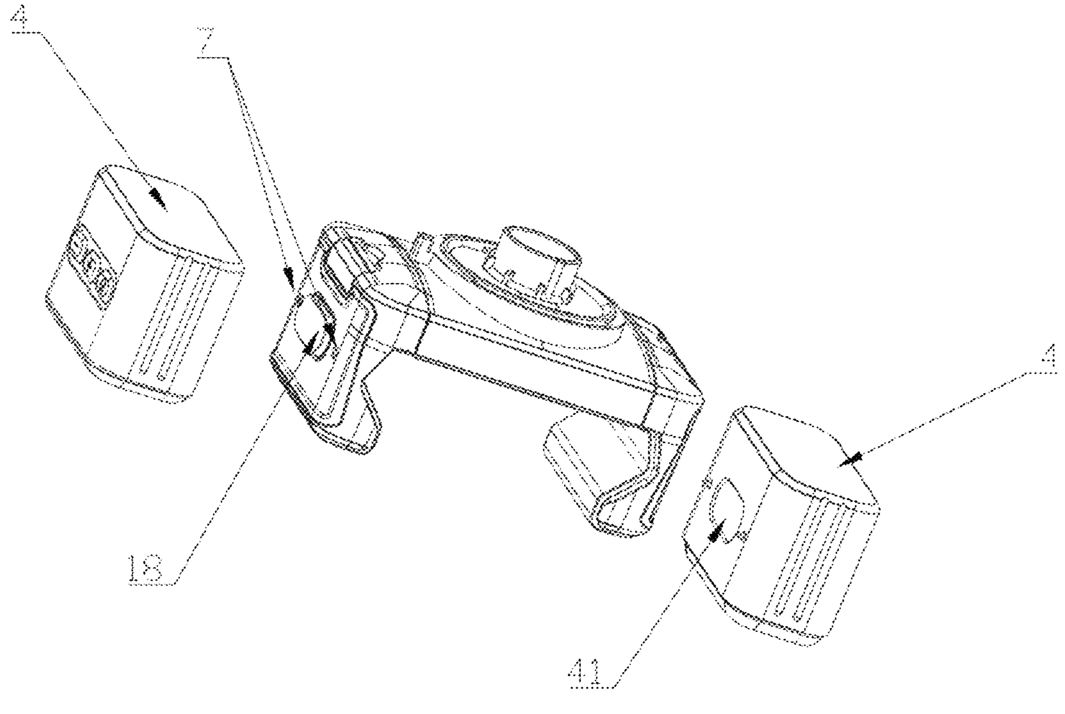
FIG. 8 is another coordination diagram of the clamping assembly and the function expansion modules according to the invention.

To solve the above technical problems, the application provides a clamping assembly. Referring to FIGS. 1-5, the clamping assembly comprises a main shell 1 and at least two clamping blocks, wherein a main control board 11 and at least one group of guide pillars 12 electrically connected to the main control board 11 are arranged in the main shell 1, and the guide pillar 12 are able to retract into and stretch out of one end surface of the main shell 1. Naturally, to realize stretching and retraction of the guide pillars 12, corresponding receding structures, such as receding holes and receding apertures, may be correspondingly formed in the main shell 1 to allow the guide pillars 12 to stretch and retract. In a case where the number of the clamping blocks is three, two of the three clamping blocks are correspondingly arranged at two ends of the main shell 1, and the other clamping block is correspondingly arranged on one side of the main shell 1. In a case where the number of the clamping blocks is four, the four clamping blocks are uniformly arranged at two ends or two sides of the main shell or the clamping blocks are arranged around an edge of the main shell to form a photographic area for clamping a photographic terminal. At least one clamping block is connected to the guide pillars 12 and provided with power supply contacts. To more clearly expound the scheme of the application, two clamping blocks are arranged and respectively referred to as a first clamping block 2 and a second clamping block 3, the first clamping block 2 and the second clamping block 3 are arranged at the two ends of the main shell 1 respectively, and surfaces, facing each other, of the first clamping block 2 and the second clamping block 3 are correspondingly connected to ends, stretching out of the main shell 1, of the guide pillars 12 at the same end; and a clamping area is formed between the first clamping block 2 and the second clamping block 3: power supply contacts 7 electrically connected to the guide pillars 12 are arranged on outer walls of the first clamping block 2 and the second clamping block 3, and the power supply contacts 7 may specifically comprise positive contacts and negative contacts, such that a driving current for external function expansion modules 4 can flow to provide a driving voltage for the function expansion modules 4 as needed by users. The guide pillars 13 that are able to stretch and retract are arranged and correspondingly connected to the first clamping block 2 and the second clamping block 3 to control and adjust relative positions of the first clamping block 2 and the second clamping block 3 to form the clamping area for fixing a mobile phone. Further, the guide pillars 12 can conduct electricity, such that after wires are reasonably connected and arranged, the guide pillars 12, as conducting structures, can work together with the power supply contacts 7 to supply power to the external function expansion modules 4 to drive the function expansion modules 4. In this way, the function expansion modules 4 no longer need to be provided with independent batteries, thus greatly optimizing the weight distribution of a device and providing better user experience.

A more specific scheme for realizing coordination between the main control board 11 and the guide pillars 12 is as follows: the clamping assembly further comprises a positive output plate 13 and a negative output plate 14 which are located on two sides of the main control board 11, wherein two sides, facing each other, of the positive output plate 13 and the negative output plate 14 are electrically connected to the main control board 11, and two sides, backing on to each other, of the positive output plate 13 and the negative output plate 14 are correspondingly and electrically connected to the guide pillars 12 in the same group. It can be easily understood that in the case where two clamping blocks are arranged and respectively referred to the first clamping block 2 and the second clamping block 3, a positive power distribution module and a negative power distribution module are formed on the two sides of the main control board 11, and the power distribution modules are connected to the corresponding output plates, for example, the positive power distribution module is connected to the positive output plate 13, and the negative power distribution module is connected to the negative output plate 14. In a case where one group of guide pillars 12, referred to as a first guide pillar group, is arranged, a first end of the first guide pillar group is correspondingly connected to the positive output plate 13 and the negative output plate 14, a second end of the first guide pillar group extends onto the first clamping block 2 to form a power supply contact 7, which consists of a positive contact and a negative contact, on the first clamping block 2. This can be simply interpreted that the first clamping block 2 is connected to the main control board by means of the first guide pillar group to form a power supply contact on a surface of the first clamping block 2, and the second clamping block 3 is connected to the main shell by means of a conventional sliding column structure. In a case where two groups of guide pillars 12, respectively referred to as a first guide pillar group and a second guide pillar group, are arranged, the first guide pillar group is connected to the first clamping block 2 as detailed above; then, a first end of the second guide pillar group is also correspondingly connected to the positive output plate 13 and the negative output plate 14, a second end of the second guide pillar group is connected to the second clamping block 3, a power supply contact is formed on a surface of the second clamping block 3, and in this case, the first clamping block 2 and the second clamping block 3 both can generate a driving voltage for the function expansion modules 4. In this embodiment, the structure is compact: the guide pillars 12 can function as main conducting structures to supply power to the external function expansion modules 4 and can also function as guide and linkage structures to adjust the relative clamping distance between the first clamping block 2 and the second clamping block 3 to fix and clamp photographic terminals of different brands and sizes; and one of the first guide pillar group and the second guide pillar group may be used for supplying power, and the other one of the first guide pillar group and the second guide pillar group may be linked to stretch and retract.

Further, each group of guide pillars 12 comprises a first guide pillar 121 and a second guide pillar 122, wherein ferrules 15 on the positive output plate 13 and the negative output plate 14 are correspondingly disposed around the first guide pillar 121 and the second guide pillar 122 on the same size: the ends, stretching out of the main shell 1, of the first guide pillar 121 and the second guide pillar in the same group are correspondingly connected to the first clamping block 2 or the second clamping block 3 at the same end to form power supply contacts 7 with corresponding polarities. For example, in an actual case where two groups of guide pillars 12 are arranged, a first guide pillar group comprises a first guide pillar 121*a* and a second guide pillar 122*a*, and a second guide pillar group comprises a first guide pillar 121*b* and a second guide pillar 122*b*; first ends of the first guide pillar 121*a* and the second guide pillar 122*a* are respectively arranged on two sides of the main control board and correspondingly connected to the positive output plate 13 and the negative output plate 14 by means of the ferrules 15, and second ends of the first guide pillar 121*a* and the second guide pillar 122*a* stretch into the first clamping block 2 to form power supply contacts 7*a* with corresponding polarities; first ends of the first guide pillar 121*b* and the second guide pillar 122*b* are respectively arranged on the two sides of the main control board and correspondingly connected to the positive output plate 13 and the negative output plate 14 by means of the ferrules 15, and second ends of the first guide pillar 121*b* and the second guide pillar 122*b* stretch into the second clamping block 2 to form power supply contacts 7*b* with corresponding polarities. The ferrules 15 are arranged to ensure stable connection and slidable and electrical contact of the guide pillars 12, thus guaranteeing the stability of power supply. Therefore, it can be understood that four ferrules 14 are uniformly arranged at two ends of the positive output plate and the negative output plate in a staggered manner to realize assembly of the first guide pillar 121*a*, the first guide pillar 121*b*, the second guide pillar 122*a* and the second guide pillar 122*b*.

Furthermore, stop pillars 123 are arranged at ends, located in the main shell, of each first guide pillar 121 and each second guide pillar 122, and the cross-sectional diameter of each stop pillar 123 is greater than the cross-sectional diameter of the first guide pillar 121 or the second guide pillar 122 where the stop pillar 123 is located. By means of the ferrules 15 which are arranged at the two ends of the positive output plate 13 and the negative output plate 14 in a staggered manner, the two first guide pillars 121 and the two second guide pillars 122 in the above case can be assembled; and the stop pillars 123 abut against the ferrules 15 to prevent complete disengagement of the first clamping block 2 and the second clamping block 3 and guarantee sliding smoothness.

To realize automatic retraction of the first clamping block 2 and the second clamping block 3, in this embodiment, each first guide pillar 121 and each second guide pillar 122 are sleeved with spring structures 9, and each spring structure 9 is arranged between the corresponding stop pillar 123 and the corresponding ferrule 15. The spring structures 9 can provide sufficient elastic potential energy and electrical conductivity to realize automatic restoration of the first clamping block 2 and the second clamping block 3 and cam improve the electrical conductivity; and the ferrules 15 work together with the stop pillars 123 to stabilize the spring structures 9 at preset positions to provide elasticity, thus ensuring the operating stability of the first clamping block 2 and the second clamping block 3. It should be noted that the ferrules 15 and the stop pillars 124 are connected by means of two ends of the spring structures 9, such that the stability of electrical conduction is guaranteed.

In this embodiment, conducting sleeves 16 are arranged at ends, stretching into the clamping block, of each first guide pillar 121 and each second guide pillar 122, an end, away from the main shell 1, of each conducting sleeve 16 is connected to one end of a conducting strip 8, and the other end of the conducting strip 8 is connected to the corresponding power supply contact 17 on the surface of the clamping block. If assembly threaded holes are directly formed in the ends of the first guide pillar 121 and the second guide pillar 122, the strength of the guide pillars 12 will be reduced, compromising the operating stability of the guide pillars 2 used as guide and linkage structures. On one hand, the conducting sleeves 16 can be stable fit with receding assembly holes of the clamping block, the first guide pillar and the second guide pillar stretch into the receding holes of the clamping block via the receding assembly holes, and during the assembly process, the conducting sleeves are assembled in the receding holes in interference fit: the conducting sleeves 16 are connected to the power supply contacts 7 and the guide pillars 12, such that tighter fit is realized without reducing the strength of the guide pillars 12, and the stability of the clamping block in the relative movement process is guaranteed. The specific wiring sequence is: the main control board, the negative output plate/the positive output plate, spring structures, the guide pillars, the conducting sleeves, and the power supply contacts. In use, a current will flow though the guide pillars 12 exposed out of a photographic terminal, but the current is far lower than the body safety current and thus will not do harm to users.

A wiring scheme of the clamping assembly may be specifically as follows: a first wiring hole 111 is formed in a surface of the main control board 1, and a second wiring hole 17 matched with the first wiring hole 111 is formed in a surface, away from the clamping area, of the main shell 11. It can be easily understood that connecting wires can be arranged by means of the first wiring hole 111 and the second wiring hole 17 to realize reasonable connection with a battery module to supply an operating voltage to external function expansion modules by means of the power supply contacts so as to drive the function expansion modules to operate. The first wiring hole 111 and the second wiring hole 17 can guarantee reasonable pivoting when the clamping assembly is connected to a support portion, such that wires will not fall off.

In this embodiment, clamping surfaces of the clamping blocks are coated with silicone layers. The silicone layers can improve the stability of a mobile phone clamped by the clamping assembly to prevent the mobile phone from falling off.

The application further provides a handheld auxiliary photographic device, comprising a grip portion 5 having a battery module arranged therein, a support rod 6 and function expansion modules 4, wherein no battery module is arranged in the function expansion modules 4, one end of the support rod 6 is connected to the grip portion 5, and the other end of the support rod 6 is connected to the clamping assembly. The battery module is arranged in the grip portion 5, such that the weight distribution is more reasonable: the support rod is a triaxial structure, and a yaw axis, a roll axis and a pitch axis of the triaxial structure can be controlled by brushless motors to realize stable photographing; and the function expansion modules 4 are detachably connected to the surfaces, provided with power supply contacts, of the clamping blocks, and are provided with power receiving pins matched with the power supply contacts. Specifically, a main control chip is arranged in the grip portion. When the function expansion modules 4 are connected to the clamping blocks, the main control chip controls the power supply contacts 7 to form a driving voltage, and the function expansion modules 4 receive the driving voltage by means of the power receiving pins to be driven to operate; and the function expansion modules 4 comprise, for example, a fill light module, an infrared module, a microphone module, a tracking camera module and the like.

In this embodiment, the function expansion modules 4 are connected to the clamping blocks by one or more of magnetic connection, snap fit and plug connection. Preferably, the function expansion modules 4 are connected to the clamping blocks by magnetic connection. Specifically, a magnet assembly 18 is arranged on an inner wall of the clamping block, a magnetic unit is correspondingly arranged on a profile of the function expansion module 4, the magnet assembly 18 can provide certain magnetic force and can be quickly used together with the function expansion module 4 provided with the magnetic unit, thus improving applicability. In a preferred scheme, the magnet assembly 18 protrudes out of the surface of the clamping block and located between the positive contact and the negative contact formed by the power supply contacts 7, a groove 41 matched with the protrusive magnet assembly 18 is formed in the function expansion module 4, the magnetic unit is arranged in the groove 41, and the groove 41 is located between a positive pin and a negative pin formed by the power receiving pins. A good guide structure is formed by the groove 41 and the protrusive magnet assembly 18, such that the function expansion module 4 can be magnetically connected to the clamping block more stably. When the function expansion module 4 is magnetically connected to the clamping block by means of the protrusive magnet assembly 18 and the groove, the power receiving pins and the power supply contacts 7 are connected correspondingly to realize quick assembly for use. The magnetic unit may be fixed to an inner wall of the profile of the function expansion module, a hole structure for exposing the magnetic unit is formed in an outer wall of the function expansion module, and the hole structure and the magnet unit work together to fulfill the same function as the groove 41.

The invention has the following advantages:

(1) The guide pillars can function as main conducting structures to supply power to external function expansion modules to drive the external function expansion modules and can also function as guide and linkage structures to adjust the relative positions of two clamping blocks to fix and clamp mobile phones of different brands and sizes;

(2) The conducting sleeves can be stable fit with the receding assembly holes of the clamping blocks and are connected to the power supply contacts and the guide pillars, such that tighter fit is realized without reducing the strength of the guide pillars, and the stability of the clamping blocks in the relative movement process is guaranteed.

Several specific embodiments of the invention are disclosed above, and the invention is not limited to the above embodiments. Any variations that can be obtained by those skilled in the art should fall within the protection scope of the invention.

What is claimed is:

1. A clamping assembly, comprising:

a main shell, a main control board and at least one group of guide pillars electrically connected to the main control board being arranged in the main shell, and the guide pillars being able to retract into and stretch out of an end surface of the main shell; and clamping blocks, at least two said clamping blocks being respectively arranged at two ends of the main shell to form a clamping area: surfaces, facing each other, of the two clamping blocks being correspondingly connected to the guide pillars stretching out of the main shell at the same end, and power supply contacts being formed on surfaces of the clamping blocks by means of the guide pillars.

2. The clamping assembly according to claim 1, further comprising a positive output plate and a negative output plate located on two sides of the main control board, wherein two sides, facing each other, of the positive output plate and the negative output plate are correspondingly and electrically connected to the main control board, and two sides, backing on to each other, of the positive output plate and the negative output plate are electrically connected to the guide pillars in a same group.

3. The clamping assembly according to claim 2, wherein each group of guide pillar comprises a first guide pillar and a second guide pillar, and ferrules on the positive output plate and the negative output plate are correspondingly disposed around the first guide pillar and the second guide pillar; and ends, stretching out of the main shell, of the first guide pillar and the second guide pillar in a same group stretch into the clamping block at the same end, and the power supply contacts are formed in an outer wall of the clamping block.

4. The clamping assembly according to claim 3, wherein stop pillars are arranged at ends, located in the main shell, of the first guide pillar and the second guide pillar in each group, and a cross-sectional diameter of each said stop pillar is greater than a cross-sectional diameter of the first guide pillar or the second guide pillar where the stop pillar is located; and the ferrules are correspondingly arranged at two ends of the positive output plate and two ends of the negative output plate.

5. The clamping assembly according to claim 4, wherein each said first guide pillar and each said second guide pillar are sleeved with spring structures, and each said spring structure is arranged between the corresponding stop pillar and the corresponding ferrule.

6. The clamping assembly according to claim 3, wherein conducting sleeves are arranged the ends, stretching into the corresponding clamping block, of each said first guide pillar and each said second guide pillar, an end, away from the main shell, of each said conducting sleeve is connected to one end of a conducting strip, and the other end of the conducting strip forms the power supply contact on the surface of the corresponding clamping block.

7. The clamping assembly according to claim 1, wherein a first wiring hole is formed in a surface of the main control board, and a second wiring hole matched with the first wiring hole is formed on a surface, away from the clamping area, of the main shell.

8. The clamping assembly according to claim 1, wherein a clamping surface of each said clamping block is coated with a silicone layer.

9. A handheld auxiliary photographic device, comprising a grip portion having a battery module arranged therein, a support rod and function expansion modules, wherein the support rod has an end connected to the grip portion and an end connected to the clamping assembly according to claim 1; and the function expansion modules are detachably connected to the surface, provided with the power supply contacts, of the clamping blocks, and are provided with power receiving pins matched with the power supply contacts.

10. The handheld auxiliary photographic device according to claim 9, wherein the function expansion modules are connected to the clamping blocks by one or more of magnetic connection, snap fit and plug connection.

* * * * *